United States Patent [19]

Baumann et al.

[11] Patent Number: 4,948,861

[45] Date of Patent: Aug. 14, 1990

[54] N,N'-DIALKYLPHENYLENEDIAMINES AS CURING AGENTS IN POLYURETHANE AND POLYUREA MANUFACTURE BY REACTION INJECTION MOLDING

[75] Inventors: William M. Baumann, Downers Grove; Ray V. Scott, Jr., Addison; David W. House, Arlington Heights; Dusan J. Engel, Des Plaines, all of Ill.

[73] Assignee: UOP, Des Plaines, Ill.

[21] Appl. No.: 265,098

[22] Filed: Oct. 31, 1988

Related U.S. Application Data

[62] Division of Ser. No. 130,838, Dec. 9, 1987, Pat. No. 4,806,616.

[51] Int. Cl.$^5$ .............................................. C08G 18/32
[52] U.S. Cl. ........................................ 528/68; 528/67; 528/76; 528/77; 528/81; 528/83; 528/85
[58] Field of Search ............... 528/68, 77, 76, 80, 528/81, 83, 84, 85, 76, 79, 67

[56] References Cited

U.S. PATENT DOCUMENTS

| | | | |
|---|---|---|---|
| 3,816,360 | 6/1974 | Taub | 528/68 |
| 4,495,081 | 1/1985 | Vanderhider et al. | 252/182 |
| 4,523,004 | 6/1985 | Lin et al. | 528/76 |
| 4,526,905 | 7/1985 | Lucast et al. | 528/76 |
| 4,529,746 | 7/1985 | Markovs et al. | 528/76 |
| 4,530,941 | 7/1985 | Turner et al. | 521/176 |
| 4,578,446 | 5/1986 | House et al. | 528/64 |
| 4,607,090 | 8/1986 | Dominguez | 528/76 |
| 4,631,298 | 12/1986 | Presswood | 528/76 |
| 4,736,009 | 4/1988 | House et al. | 528/68 |
| 4,736,009 | 4/1988 | House et al. | 528/67 |
| 4,757,096 | 7/1988 | Berthevas et al. | 528/76 |
| 4,801,674 | 1/1989 | Scott, Jr. et al. | 528/76 |
| 4,806,615 | 2/1989 | Rice et al. | 528/76 |

Primary Examiner—John Kight, III
Assistant Examiner—Dennis R. Daley
Attorney, Agent, or Firm—Thomas K. McBride; Eugene I. Snyder

[57] ABSTRACT

N,N'-dialkyl- and diarylphenylenediamines are effective curing agents in combination with other polyamines and polyols in reaction injection molding for a diverse class of polyisocyanates. The diamines provide a broad spectrum of cure times, as well as giving elastomers an interesting and useful diversity of properties. Such polyamines may be used as a constituent in a blend of polyamines as the isocyanate-reactive component, in which case the elastomer may be viewed as predominantly a polyurea, or as a constituent in a blend with polyols, in which case the elastomer may be viewed as an elastomer with both urethane and urea segments.

13 Claims, No Drawings

N,N'-DIALKYLPHENYLENEDIAMINES AS CURING AGENTS IN POLYURETHANE AND POLYUREA MANUFACTURE BY REACTION INJECTION MOLDING

CROSS REFERENCE TO RELATED APPLICATION

This application is a division of application Ser. No. 130,838, filed Dec. 9, 1987, now U.S. Pat. No. 4,806,616, all of which is hereby incorporated by reference.

BACKGROUND OF THE INVENTION

As a subclass of commercially available polymers, polyurethane elastomers have several properties whose advantages confer unique benefits on these products. Typically, polyurethanes show high abrasion resistance with high load bearing, excellent cut and tear resistance, high hardness, resistance to ozone degradation, yet are pourable and castable. Compared to metals, polyurethanes are lighter in weight, less noisy in use, show better wear and excellent corrosion resistance while being capable of less expensive fabrication. Compared to other plastics, polyurethanes are non-brittle, much more resistant to abrasion, and exhibit good elastomeric memory. Polyurethanes find use in such diverse products as aircraft hitches, bushings, cams, gaskets, gravure rolls, star wheels, washers, scraper blades, impellers, gears, and drive wheels.

Part of the utility of polyurethanes derives from their enormous diversity of properties resulting from a relatively limited number of reactants. Typically, polyurethanes are prepared on site by curing urethane prepolymers, which are adducts of polyisocyanates and polyhydric alcohols. A large class of such prepolymers are approximately 2:1 adducts of a diisocyanate, OC—N—Y—NCO, and a diol, HO—Z—OH, whose resulting structure is OCN—Y—NHCO$_2$—Z—O$_2$CNH—Y—NCO. Although Y is susceptible of great variety, usually being a divalent alkyl, cyclohexyl, or aromatic radical, in fact the most available prepolymers are made from toluene diisocyanate (TDI), most readily available as a mixture of 2,4- and 2,6-isomers which is rich in the former isomer, or methylene-4,4'-diphenyldiisocyanate (MDI). The diols used display a greater range of variety; Z may be a divalent alkyl radical (i.e., an alkylene group), and the diols frequently are ethers or esters which are the condensation products of glycols with alkylene oxides or dicarboxylic acids, resp.

The polyurethane elastomers are formed by curing the prepolymer. Curing is the reaction of the terminal isocyanate groups of the prepolymer with active hydrogens of a polyfunctional compound so as to form high polymers through chain extension and, in some cases, crosslinking. Diols, especially alkylene diols, are the most common curing agents for MDI-based prepolymers, and representing such diols with the structure HO-X-OH, where X is an organic moiety, most usually an alkylene group, the resulting polymer has as its repeating unit,

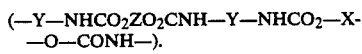

(—Y—NHCO$_2$ZO$_2$CNH—Y—NHCO$_2$—X—O—CONH—).

Where a triol or a higher polyhydric alcohol is used crosslinking occurs to afford a nonlinear polymer.

Although other polyfunctional chemicals, especially diamines, are theoretically suitable, with but a few exceptions none have achieved commercial importance as a curing agent. The major exception is 4,4'-methylene-di-ortho-chloroaniline, usually referred to as MOCA, a curing agent which is both a chain extender and a crosslinker. TDI-based prepolymers typically are cured with MOCA, and the resulting products account for perhaps most of the polyurethane elastomer market. One reason that polyhydric alcohols generally have gained acceptance as curing agents is that their reaction with urethane prepolymers is sufficiently fast to be convenient, but not so fast as to make it difficult to work with the resulting polymer. In casting polymers it is desirable that the set-up time be reasonably short, yet long enough for the material to be cast into molds. This property is conventionally referred to as pot life. Generally speaking, diamines react with prepolymers, and especially MDI-based prepolymers, so quickly that they are not usable as curing agents. However, primary aromatic diamines with electronegative groups on the aromatic ring, or with alkyl groups ortho to the amino moiety, exhibit sufficiently decreased reactivities with *some* prepolymers as to afford a desirable pot life, hence the use of, for example, MOCA as a curing agent for TDI-based prepolymers. However, MOCA and others of the aformentioned diamines still remain too reactive to be used, for example, with MDI-based prepolymers.

On the other hand, the advent of reaction injection molding (RIM) provides a means of processing polyurethanes which is well adapted to a short pot life. Reaction injection molding is a process that allows polymerization and crosslinking to take place simultaneous with forming of a part into its final shape. Because of the rapid curing of polyurethanes, compatible with the fast cycle times of RIM, these polymers seem exceptionally well suited to RIM processing although epoxies, nylons, and even polyesters have been made by the RIM process.

In RIM, two highly reactive streams of chemicals are brought together under high pressure in a small mixing chamber where the streams are impingement mixed by being sprayed directly into each other before entering the mold. The mixed material flows directly into a mold at 0.35–0.7 MPa (50–100 psi), a low pressure compared to that used in standard injection molding, where the chemical reaction is completed and the part cures. One of the ingredient streams (the first stream) contains the isocyanate and the other stream (the second stream) contains components having isocyanate-reactive hydrogens, such as polyols and amines, and other components as catalysts, pigments, blowing agents, and surfactants. Much of the technology is currently used in the automotive industry to produce parts such as bumper covers and fenders. Parts are produced on a cycle of 3 minutes or less, and large urethane parts have been successfully demolded in 30 seconds or less after injection.

We have found that a large class of alkylated aromatic polyamines are excellent isocyanate-reactive components, or curing agents, for polyisocyanates in the preparation of RIM elastomers. Among the advantages of the curing agents of this invention are that the resulting elastomers can be expected to show excellent compression set, to have quite high tensile strength, and to show greater elongation and increased impact properties. The resulting elastomers are thermoplastic or thermosetting polymers, depending on whether or not a crosslinking agent has been added, or if any of the other components present act as crosslinking agents. Additionally, the curing agents themselves for the most part are liquids at room temperature, facilitating their use at RIM temperature. The curing agents may be used for both TDI and MDI-based polyisocyanates, which give rise to the two largest classes of polyurethane and polyurea elastomers. In short, the unique properties of both the curing agents and the resulting elastomers make each very highly desirable in RIM formulations.

The curing agents of this invention are secondary aromatic diamines, which as a class formerly were not considered as acceptable curing agents for polyurethane and polyurea elastomers. U.S. Pat. No. 3,846,351 describes the quite narrow use of the N,N'-dialkylphenylenediamines used in our invention in combination with polyols as catalysts and chain extenders in the non-RIM production of flexible polyurethane foams. It is important to recognize that such secondary diamines were taught to be used only in combination with polyols, preferably at the relatively low level of 0.5-5 parts per 100 parts of polyol. In U.S. Pat. No. 3,711,571 the patentee cites di-sec-butyl-p-phenylenediamine as the sole example of a disecondary amine used as a chain extender for typical urethane prepolymers. Mixtures of aromatic primary diamines and aromatic secondary diamines to cure urethane prepolymers were disclosed in U.S. Pat. No. 3,194,793 where the patentee taught that the secondary diamines could not constitute more than 75% of the diamine mixture without deleterious consequences. In an examination of aromatic diamines as chain extenders in polyurethane elastomers by reaction injection molding, the sole secondary aromatic diamine examined, N,N'-diisopropyl-4,4'-methylenedianiline, afforded products whose properties were generally unacceptably inferior to those exhibited by polyurethanes made with primary aromatic diamines as curing agents. "D. Nissen and R. A. Markovs," Proceedings of the 27th SPI Annual Technical/Marketing conference, 71-8. More recently we have shown in U.S. Pat. No. 4,578,446 that contrary to the prior conventional wisdom alkylated methylenedianilines are suitable curing agents for urethane prepolymers, i.e., in elastomer production via non-RIM processes.

To aid in exposition the isocyanate-reactive components can be classified as either polyols (polyhydric alcohols) or polyamines. Each of these classes has two functionally defined subclasses; backbone polyols (or polyamines) and chain extender polyols (or polyamines). The difference is that, e.g., the backbone polyol reacts with the isocyanates in the first stream to afford short polymeric segments, and the chain extender polyamine links the short segments to form longer chains. The diamines of this invention act as chain extender polyamines.

The RIM elastomers which can be made from the amines of this invention are diverse and depend upon the nature of the isocyanate-reactive stream. In one variant the second stream as the isocyanate-reactive component is a mixture of backbone and chain extender polyamines. That is, the second stream may have catalysts, pigments, surfactants, etc., but contain little, if any, isocyanate-reactive components other than the polyamines. In this variant the elastomer is exclusively, or almost so, a polyurea.

In another variant the second stream has as the isocyanate-reactive component a mixture of the diamines of this invention, which act as chain extender amines, and various backbone polyols. The mixture will generally have from about 20 to about 80% of amine, on an equivalents basis, and more usually contains 30-70 equivalents percent of amine. (An equivalent of polyamine or polyol is an amount which furnishes as many amino or hydroxyl groups as there are isocyanate groups in the first stream. As used herein, "equivalents percent" refers to the percentage of amine and/or polyol equivalents relative to isocyanate equivalents.)

In each of the foregoing variants a portion of the chain-extender diamines of this invention may be replaced by a chain extender polyol or a second chain extender polyamine. Although this will be described more fully within, to exemplify one of these subvariants the second stream may contain a backbone polyamine, the chain extender diamines of this invention, and a chain extender polyol where the polyol level is roughly 20-100 equivalents percent of the chain extender diamine.

SUMMARY OF THE INVENTION

The object of this invention is to prepare polyurethane and polyurea elastomers by reaction injection molding using N,N'-dialkyl- or diarylphenylenediamines as curing agents. In an embodiment the curing agent is an alkylated diamine where the alkyl group contains up to about 20 carbon atoms. In another embodiment the amine is an N,N'-dialkyl-p-phenylenediamine. Other objects and embodiments will become obvious from the description which follows.

DESCRIPTION OF THE INVENTION

In one aspect the invention herein is a reaction injection molded elastomer made by reacting a polyisocyanate and a mixture of isocyanate-reactive material having one or more diamines of this invention as a chain extender polyamine. Where the mixture is a blend of backbone and chain extender polyamines the resulting elastomers may be viewed as polyureas. Where the mixture is a blend of backbone polyol and chain extender polyamines the resulting elastomers may be viewed as mixed polyureas-polyurethanes. However, it will be understood by those skilled in the art that the elastomers made according to the latter are complex chemical structures having both polyurethane and polyurea segments.

The nature and breadth of our invention may be summarized by characterizing the reactive components in the two streams as well as their ratio of equivalents. The key for the following table is:

I = polyisocyanate;
$B_A$, $B_o$ = backbone polyamine and polyol, resp.;
D = diamine of this invention;
$E_A$, $E_o$ = chain extender polyamine and polyol, resp.

| | Component Variation in RIM Elastomer | | | |
|---|---|---|---|---|
| Component | Case 1 | Case 2 | Case 3 | Case 4 |
| I | x | x | x | x |
| $B_A$ | x | x | | |
| $B_o$ | | | x | x |
| D | x | x | x | x |
| $E_A$ and/or $E_o$ | | x | | x |

The combination of specified components along with their ratios then fully define this invention. Those ratios which are independent variables, their verbal characterization, and their values for variants of our invention follow.

The ratio $r_1$, $$r_1 = \frac{B_A \text{ (or } B_o) + D + E_o + E_A}{I},$$

is the ratio of equivalents of isocyanate-reactive components in the second stream to the polyisocyanate in the first stream. In all cases this ratio is between 0.7 and 1.3, and more generally is between 0.85 and 1.05, and even more frequently is between about 0.90 and about 1.0.

The ratio $r_2$, $$r_2 = \frac{D + E_A + E_o}{B_A \text{ (or } B_o) + D + E_A + E_O},$$

is the ratio of equivalents of the diamines of this invention plus other chain extenders, if any, to the total isocyanate-reactive components of the second stream. In all cases $r_2$ is between 0.2 and 0.8, with the preferred ratio being from about 0.3 to about 0.7. Stated differently the ratio varies around a central point where the number of equivalents of the backbone polyamine or polyol is equal to that of the other isocyanate-reactive components of the second stream.

In one variant $E_A$, $E_o = O$, i.e., there are no chain extenders in the second stream other than the diamines of this invention. This corresponds to case 1 and case 3 resp.

In another variant the second stream contains a chain extender polyol in addition to the other isocyanate-reactive components $B_A$ (or $B_o$) and D. This polyol is present to the extent of about 20 to about 100 equivalents percent based on the diamines of this invention. Since the diamines of this invention have been designated as chain extender polyamines, the foregoing is equivalent to the statement that chain extender polyols constitute from about one-sixth to about one-half of the total chain extender mixture. That is, $r_3$, where $$r_3 = \frac{E_o}{E_o + D},$$

ranges between about 0.17 and about 0.50.

In the last variant to be discussed here the second stream contains a second chain extender amine in addition to the other isocyanate reactive components $B_A$ (or $B_o$) and D. In this case the diamines of our invention are only a minor component, with the second chain extender amine constituting 80–99 equivalents percent of the chain extender components. Defining $r_4$ as, $$r_4 = \frac{E_A}{D + E_A},$$

this ratio of equivalents is between about 0.80 and about 0.99.

A broad variety of polyisocyanates may be used in the preparation of RIM elastomers and may be exemplified by such materials as the toluene diisocyanates, p- and m-phenylene diisocyanate, tetramethylene diisocyanate, 1,6-hexamethylene diisocyanate, 1,4-cyclohexylene diisocyanate, 4,4'-methylenedicyclohexyl diisocyanate, 4,4'-methylenediphenyl diisocyanate, 3,3'-dimethyl-4,4'-diphenylmethane diisocyanate, 1,5-tetrahydronaphthalene diisocyanate, dianisidine diisocyanate, bitolylene diisocyanate, naphthalene-1,4-diisocyanate, bis(2-methyl-3-isocyanatophenyl)methane, bis(3-methyl-4-isocyanatophenyl)methane, and 4,4'-diphenylpropane diisocyanate.

Also frequently used in RIM processing are methylene-bridged polyphenyl polyisocyanates such as are described and discussed in U.S. Pat. No. 4,433,067, especially the polyisocyanates based on methylenediphenyl diisocyanate, especially the 4,4'-isomer and the uretonimine modified MDI as described therein. The term polyisocyanate also includes quasi prepolymers of polyisocyanates with active hydrogen containing materials where the polyisocyanate is typically reacted with from about 0.05 to about 0.3 equivalents of a polyol. In principle a vast number of polyisocyanates are suitable for making RIM elastomers. However, in practice polyisocyanates based on MDI are currently those principally used in commerce.

If the diamines of this invention are used as the sole isocyanate-reactive component of the second stream the resulting elastomer is too brittle to be usable. Consequently, it is necessary to have as another isocyanate-reactive component one which will provide a soft segment in the resulting elastomer. We here refer to such components as backbone polyamines and backbone polyols.

The backbone polyamines used in RIM are well known to those skilled in the art but will be mentioned here, though not in great detail, and include diamines, triamines, and possibly higher polyfunctional amines which are primary amines. One class of such amines is related to aminodiphenylmethane-ethers and esters of the formulae, H$_2$NC$_6$H$_4$CH$_2$C$_6$H$_4$NHC(O)—O—X—O—C-(O)NHC$_6$H$_4$CH$_2$C$_6$H$_4$NH$_2$, H$_2$NC$_6$H$_4$CH$_2$C$_6$H$_4$NHC(O)—O—X—C(O)O—C-(O)NHC$_6$H$_4$CH$_2$C$_6$H$_4$NH$_2$, H$_2$NC$_6$H$_4$CH$_2$C$_6$H$_4$NHC(O)—O—(O)C—X—C-(O)O—C(O)NHC$_6$H$_4$CH$_2$C$_6$H$_4$NH$_2$.

In these compounds X is usually an alkylene group, an alkyleneoxy group, or a poly(alkyleneoxy) group. A similar set of backbone polyamines used in RIM results from substitution of both H$_2$NC$_6$H$_4$CH$_2$C$_6$H$_4$NHC(O)—groups by H$_2$NC$_6$H$_3$(CH$_3$)NHC(O)—moieties.

Another class of backbone polyamines have the formula H$_2$N—Y—NH$_2$. In one group Y is an alkylene chain. In a larger group Y is a poly(alkyleneoxy) or a polyester moiety with an alkylene group at both terminii. So, for example, in this group are amine-capped polyols which are the reaction product of a polyol and then an amine with alkylene oxides as well as amine-capped hydroxyl-containing polyesters. Materials of molecular weight in the 200–6000 range are most often utilized.

Tri- and higher polyamines of similar structure to that in the foregoing paragraph also may be utilized. For example, the reaction of pentaerythritol with an alkylene oxide will give a polyether product, one terminus of which has the structural unit

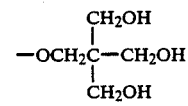

This can be amine-capped to give a triamine, and if the hydroxyl group at the other terminus is so capped there will result a tetraamine. Both kinds of products may be used as backbone polyamines.

The backbone polyols used in RIM are equally well known. The polyols used are usually dihydric with trihydric and higher polyhydric polyols used to a lesser degree. Examples of suitable polyols include ethylene glycol, 1,2-propylene glycol, 1,3-propylene glycol, 1,4- and 2,3-butylene glycol, 1,6-hexanediol, 1,8-octanediol, neopentyl glycol, cyclohexane dimethanol, 2-methyl-1,3-propanediol, glycerol, trimethylolpropane, 1,2,6-hexanetriol, 1,2,4-butanetriol, pentaerythritol, mannitol, sorbitol, diethylene glycol, triethylene glycol, tetraethylene glycol, poly(ethylenoxy) glycols, generally dipropylene glycol, poly(propylenoxy) glycols, generally dibutylene glycol, poly(butylenoxy) glycols generally, and the polymeric glycol from caprolactone, commonly known as polycaprolactone.

Other polyhydroxy materials of higher molecular weight are polymerization products of epoxides, such as ethylene oxide, propylene oxide, butylene oxide, styrene oxide, and epichlorohydrin, with materials having reactive hydrogen compounds, such as water and, more particularly, alcohols, including ethylene glycol, 1,3- and 1,2-propylene glycol, trimethylolpropane, etc. Amino alcohols may be made by condensing amino-containing compounds with the foregoing epoxides, using such materials such as ammonia, aniline, and ethylene diamine.

Hydroxyl-containing polyesters, polythioethers, polyacetals, polycarbonates, and polyester amides also may be used instead of or together with the foregoing polyols. Suitable polyesters include the reaction product of polyhydric alcohols and polybasic, preferably dibasic, carboxylic acids. The polyhydric alcohols which are often used include the dihydric alcohols mentioned above. Examples of dicarboxylic acids include succinic acid, adipic acid, suberic acid, azelaic acid, sebacic acid, glutaric acid, phthalic acid, maleic acid, and fumaric acid. Hydroxyl-containing polythioethers, polyacetals, polycarbonates, and polyesteramides are less frequently employed in the preparation of RIM elastomers. However, these are sufficiently well known to those practicing the art that they need not be further elaborated upon here.

The elastomer is made by reacting the polyisocyanate with a backbone polyamine or polyol and at least one N,N'-disubstituted phenylene-diamine of the structure,

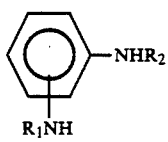

The para-phenylenediamines are somewhat favored, although the use of metaphenylenediamines, and to a lesser extent the ortho-isomers, especially in mixtures with the para isomer, is relatively common.

The R groups are alkyl, alkenyl or aryl moieties—i.e., a monovalent radical whose parent is a linear or branched alkane, alkene, or aromatic hydrocarbon— where each is independently selected from the group consisting of alkyl or alkenyl moieties containing from 1 up to about 20 carbon atoms, and more preferably between 1 and about 10 carbon atoms, especially those having from 1 to 6 carbons. The alkyl or alkenyl group may be a primary, secondary, or tertiary group, although when it is tertiary there is the risk that cure time may be too long to be commercially acceptable. Secondary alkyl or alkenyl groups are preferred, and among these the secondary butyl group is particularly preferred. Examples of alkyl groups which may be used in the practice of this invention include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl moieties. Examples of alkenyl groups are the unsaturated counterparts of the aforementioned alkyl groups. As stated previously, secondary alkyl or alkenyl groups, i.e., those branched at the carbon atom bound to the nitrogen atom, and secondary alkyl groups in particular, are preferred in the practice of this invention. Representative of such groups are 2-propyl, 2-butyl, 2-pentyl, 3-pentyl, 2-hexyl, 3-hexyl, and so forth. Representative aryl moieties include phenyl, tolyl, xylyl, and their various isomers.

Cure time will depend not only on the type of alkyl groups on the diamine, but also will depend on the presence of other components if a blend of chain extending agents is used, as well as the nature of other chain extenders in such a blend. For example, in general it will be found that cure times as a function of R increase in the order,

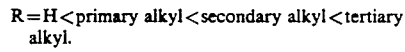

In view of the foregoing it should be clear that the N,N'-disubstituted phenylenediamines of this invention can be expected to manifest an enormous range of cure time in RIM. This variability presents distinct advantages in permitting the end user to tailor the diamine to his particular needs. Since the properties of the resulting elastomer also will vary with the diamines of this invention, and since many N,N'-dialkyl-or diarylphenylenediamines may be chosen with the same cure time, the end user generally also will have a broad choice of our diamines depending on the performance characteristics sought for the final product.

The alkylated diamines of this invention typically are prepared by conventional alkylation procedures performed on the precursor primary amine. The second amino group may be at either the 2, 3, or 4 position in the diamine. However, as previously noted, it is most desirable that it be at the 4 position. A major advantage arises from the ease of synthesis of such materials, although it is not to be implied that there are no differences in such materials as curing agents.

Defining an equivalent of polyamine or polyol as an amount which furnishes as many amino groups or hydroxyl groups, resp., as there are isocyanate groups in the first polyisocyanate stream, from about 0.70 to about 1.3 equivalents total of the backbone polyamine or backbone polyol and our diamine are used in curing, with the range from about 0.85 to about 1.05 more frequently used, and from about 0.90 to about 1.0 being the more usual one. Since each molecule of our diamine has 2 amino groups, neither of which is tertiary, the diamines of this invention act as chain extenders and not as crosslinkers. As elaborated upon below the curing mix may contain other materials, including other isocyanate-reactive components such as chain extender polyols and polyamines, in addition to, or partly replacing, the diamines of this invention, although the presence of such materials may not be necessary to the success of this invention.

Catalysts may need to be used in some cases to decrease the reaction time in order to obtain a mixture which sets sufficiently rapidly in the mold to conform to the process requirements of RIM. Organic tin compounds are probably most frequently used and include such materials as the tin(II) salts of carboxylic acids such as tin(II) acetate, tin(II) octoate, tin(II) ethylhexoate and tin(II) laurate, as well as such materials as the dialkyl tin salts of carboxylic acids as exemplified by dibutyltindiacetate, dibutyltindilaurate, dibutyltinmaleate, and dioctyltindiacetate. Such tin salts may be used either alone or as a complex with amidines such as amino pyridines, amino pyrimidines, hydrazino pyridines, and tetrahydropyrimidines.

Catalysts based on metals such as lead, iron, mercury, cobalt and manganese also have been used, and include compounds such as cobalt (III) acetylacetonate, cobalt naphthoate, manganese naphthoate, lead oleate, zinc naphthenate and zirconium naphthenate. Other catalysts which may be used include tertiary amines such as triethylamine, tributylamine, N-methylmorpholine, 1,4-diaza-bicyclo-(2,2,2)-octane, N-methyl-N'-dimethylaminoethylpiperazine, N,N-dimethylbenzylamine, N,N-dimethylcyclohexylamine, and 1,2-dimethylimidazole.

Other catalysts such as silaamines and basic nitrogen compounds such as tetraalkyl ammonium hydroxide, alkali metal hydroxides such as sodium hydroxide, and alkali metal alcoholates such as sodium methylate also have been used as catalysts. These catalysts are generally used in an amount from about 0.01 to about 10% by weight, preferably from about 0.05 to about 1.0% by weight, based on the quantity of polyisocyanate and the quantity of materials reacting with the polyisocyanate.

The second stream also may contain materials such as blowing agents and surfactants. Among suitable blowing agents are water and readily volatile organic substances or dissolved inert gases such as acetone, ethylacetate, methanol, ethanol, halogen substituted alkanes including methylene chloride, chloroform, vinylidene chloride, monofluorotrichloromethane, chlorodifluoromethane, and dichlorofluoromethane, butane, hexane, heptane, diethyl ether, nitrogen, air, carbon dioxide, etc. Examples of surfactants include the sodium salts of sulfonates or of fatty acids, amine salts of fatty acids, alkali metal or ammonium salts of sulfonic acids, polyether siloxanes, and the like. The second component also may contain pigments, dyes, flame retardants, stabilizers, plasticizers, fungicides and bactericides, and fillers.

As previously noted the blend of backbone polyamine or polyol and the chain extender amines of our invention may also contain one or more chain extender polyols or a second chain extender polyamine. The chain extender polyols used in this branch of our invention are polyhydric alcohols with more than two reactive hydroxyl groups per molecule, i.e., more than two hydroxyl groups per molecule must react with the terminal isocyanate groups of the polyisocyanate. Normally this means the polyols are at least trihydric, but since some trihydric alcohols may have one or more hydroxyl groups unreactive under the reaction conditions of curing, it is not invariably true that a trihydric alcohol will suffice. In particular, phenolic hydroxyl moieties, and hydroxyl groups attached to a tertiary carbon atom, usually will be unreactive in curing polyisocyanates, whereas the hydroxyl moiety associated with primary and secondary alcohols will be reactive.

With the use of polyols having more than two reactive hydroxyls per molecule it is clear that such materials act as both cross-linkers and chain extenders, although for convenience we refer to such materials as chain extender polyols. Among the polyols which may be used are included 1,1,1-tri(hydroxymethyl)propane, otherwise known as 2,2-di(hydroxymethyl)-1-butanol, 1,1,1-tri(-hydroxymethyl) ethane, N,N,N',N'-tetrakis(2-hydroxypropyl)ethylene diamine, 2,4,6-tris(N-methyl-N-hydroxymethylaminomethyl) phenol, 1,2,6-hexanetriol, 1,2,4-butanetriol, pentaerythritol, mannitol, sorbitol, triglycols, castor oils, triisopropanolamine, and N,N,N',N'-tetrakis(hydroxyethyl)ethylene diamine. Chain extender polyols commonly are used at a level between about 20 and about 100 equivalents percent based on the diamines of our invention subject to the constraints on the ratios $r_1$ and $r_2$; vide supra.

Where the blend of backbone polyamine or polyol and the diamines of our invention contains a second chain extender polyamine, the latter generally is a diamine where both amino groups are primary amino groups, and even more frequently is an aromatic primary diamine. Such materials include 1-methyl-3,5-diethyl-2,4-diaminobenzene, 1-methyl-3,5-diethyl-2,6-diaminobenzene, toluene diamine, 1,3,5-triethyl-2,6-diaminobenzene, 3,3'-dichloro-4,4-diaminodiphenylmethane (MOCA) and the like. When used in a blend with the diamines of this invention the second chain extender polyamine constitutes the major portion of the blend, viz., from about 80 to about 99 equivalents percent of the mixture of the diamines of this invention and the second chain extender polyamine is the latter.

The process of reaction injection moldings has been described above and will not be repeated here. Solidification of the reaction mixture after injection into the mold usually takes place so rapidly that the mold may be opened within about 15–30 seconds to afford material with sufficient green strength to be handled. Post curing of the elastomer is optional and will depend on the desired properties of the end product, the various components used, etc. Where post curing is desired it generally will be performed in a range between about 100° C. and about 150° C. for a time between about 1 and about 24 hours.

EXAMPLES

Typical Rim Formulation

A typical RIM machine for polyurethane and polyurea RIM may be employed without modification. In the A-side (or the isocyanate) reservoir of the RIM machine is added the isocyanate to be used: In this case, a low molecular weight MDI-ether prepolymer. In the B-side reservoir are added the polyol, the diamines of this invention, and any other co-cures or additives compatible with the polyol and diamine. In polyurea RIM, the polyol would be replaced with a polyamine in order to form the backbone of the polyurea with the isocyanate. Both the A- and B-sides are cycled through their respective heat exchangers where both are brought up to 70° C. Both sides are flowed to their respective metering pumps which are loaded for the shot. The ratio of the two (which determines the stoichiometry of the final polymer) and the shot size have been predetermined. The pistons of the metering pumps are engaged and the shot forced into the mixing head and through to the mold which is attached to the mixing head and is heated to between 70° and 100° C. After about 30 to 60 seconds, the mold is opened, the part ejected, the mold and the mixing head cleaned, and a new shot readied. The part may be post-cured from 30 minutes to 17 hours depending on the type of polymer made and the components used. Several representative formulations and RIM conditions are summarized below.

TABLE 1
Sample RIM Formulations using Representative Diamines (1).

| | | | |
|---|---|---|---|
| Isocyanate | MDI, carbodiimide modified 0.588 kg 4.14 equiv. | Poly(MDI) F = 2.7[3] 0.723 kg 5.40 equiv. | MDI Prepolm 0.756 kg 4.14 equiv. |
| Polyol Backbone | Polyether, Mol. Wt. 2900 F = 3 2.000 kg 2.07 equiv. | Polyether, Mol. Wt. 2000 F = 2 2.000 kg 2.00 equiv. | Polyether, Mol. Wt. 2900 F = 3 2.000 kg 2.07 equiv. |
| Diamine | (2) 0.217 kg 1.97 equiv. | (2) 0.356 kg. 3.23 equiv. | (2) 0.217 kg 1.97 equiv. |
| Catalyst | DBTDL[4], 0.15% | DBTDL, 0.15% | DBTDL, 0.15% |
| Stream Temp. | 70° C. | 70° C. | 70° C. |
| Mold Temp | 70° C. | 70° C. | 70° C. |
| Post-cure Temp. | 100° C. | 85° C. | 100° C. |
| Post-cure Time, h | 1.0 | 1.0 | 1.0 |

(1) Ratios of the reagents metered out reflect the masses listed in the table.
(2) Diamine is N,N'-di(2-butyl)-phenylenediamine. Isocyanate index is 1.05 in all cases.
(3) F is the average number of reactive sites per molecule
(4) Dibutyltin dilaurate

TABLE 2
Sample Polyurethane RIM Formulations using Diamines and a Chain Extender Polyamine (1).

| | | | |
|---|---|---|---|
| Isocyanate | MDI, carbodiimide modified 0.569 kg 4.00 equiv. | MDI carbodiimide modified 0.474 kg 3.33 equiv. | MDI Carbodiimide modified 0.474 kg 3.33 equiv. |
| Polyol Backbone | Polyether, Mol. Wt. 2000 F = 2 2.000 kg 2.00 equiv. | Polyether, Mol. Wt. 3600 F = 3 2.000 kg 1.67 equiv. | Polyether, Mol. Wt. 3600 F = 3 2.000 kg 1.67 equiv. |
| Diamine | (2) 0.042 kg. 0.38 equiv. (20%) | (2) 0.009 kg. 0.08 equiv. (5%) | (2) 0.009 kg 0.08 equiv. (5%) |
| Chain extender Polyamine | A (3) 0.135 kg 1.52 equiv. (80%) | A (3) 0.134 kg 1.50 equiv. (95%) | B (4) 0.161 kg 1.50 equiv. (95%) |
| Catalyst | NONE | NONE | NONE |
| Stream Temp. | 70° C. | 70° C. | 70° C. |
| Mold Temp | 70° C. | 70° C. | 70° C. |
| Post-cure Temp. | 100° C. | 100° C. | 100° C. |
| Post-cure Time, h | 1.0 | 1.0 | 1.0 |

(1) Ratios of the reagents metered out reflect the masses listed in the table.
(2) Diamine is N,N'-di(2-butyl)-phenylenediamine. Equivalent weight is 110.2. Isocyanate index is 1.05 in all cases.
(3) A = diethyltoluene diamine (DETDA)
(4) B = Ethacure 300, (Ethyl Corp.), an 80/20 isomeric mixture of di(methylthio)-2,4-toluene diamine and di(methylthio)-2,6-toluene diamine

TABLE 3
Sample Polyurethane and Polyurea RIM Formulations using Diamines (1).

| | | | |
|---|---|---|---|
| Isocyanate | MDI Prepolm 0.833 kg 4.56 equiv. | MDI Prepolm 0.609 kg 3.34 equiv. | MDI Prepolm 0.438 kg 2.40 equiv. |
| Polyol Backbone | Polyether, Mol. Wt. 2630 | Polyether, Mol. Wt. 3600 | — |
| | F = 3[3] 2.000 kg 2.28 equiv. | F = 3 2.000 kg 1.67 equiv. | |
| Polyamine Backbone | — | — | Polyoxyalkylene amine Mol. Wt. 5000 F = 3 2.000 kg 1.20 equiv. |
| Diamine | (2) 0.239 kg. 2.17 equiv. | (2) 0.174 kg. 1.58 equiv. | (2) 0.126 kg 1.14 equiv. |
| Catalyst | NONE | NONE | NONE |
| Stream Temp. | 70° C. | 70° C. | 70° C. |
| Mold Temp | 70° C. | 70° C. | 70° C. |
| Post-cure Temp. | 100° C. | 100° C. | 100° C. |
| Post-cure Time, h | 1.0 | 1.0 | 0.5 |

(1) Ratios of the reagents metered out reflect the masses listed in the table.
(2) Diamine is N,N'-di(2-butyl)-phenylenediamine. Equivalent weight is 110.2. Isocyanate index is 1.05 in all cases.
(3) F is the average number of reactive sites per molecule.

TABLE 4
Polyurea RIM Formulations using Diamines and a Chain Extender Polyamine (1).

| | | | |
|---|---|---|---|
| Isocyanate | MDI, carbodiimide modified 0.341 kg 2.39 equiv. | MDI prepolym. 0.438 kg 2.40 equiv. | MDI Prepolym 0.438 kg 2.40 equiv. |
| Polyamine Backbone | Polyoxyalkylene amine Mol. Wt. 5000 F = 3[5] 2.000 kg 1.20 equiv. | Polyoxyalkylene amine Mol. Wt. 5000 F = 3 2.000 kg 1.20 equiv. | Polyoxyalkylene amine Mol. Wt. 5000 F = 3 2.000 kg 1.20 equiv. |
| Diamine | (2) 0.021 kg. 0.23 equiv. (20%) | (2) 0.006 kg. 0.06 equiv. (5%) | (2) 0.006 kg 0.06 equiv. (5%) |
| Chain extender Polyamine | A (3) 0.081 kg 0.91 equiv. (80%) | A (3) 0.096 kg 1.08 equiv. (95%) | B (4) 0.116 kg 1.08 equiv. (95%) |
| Catalyst | NONE | NONE | NONE |
| Stream Temp. | 50° C. | 50° C. | 50° C. |
| Mold Temp | 70° C. | 70° C. | 70° C. |
| Post-cure Temp. | 100° C. | 100° C. | 100° C. |
| Post-cure Time, h | 1.0 | 1.0 | 1.0 |

(1) Ratios of the reagents metered out reflect the masses listed in the table.
(2) Diamine is N,N'-di(2-butyl)-phenylenediamine. Equivalent weight is 110.2. Isocyanate index is 1.05 in all cases.
(3) A = diethyltoluene diamine (DETDA)
(4) B = Ethacure 300, (Ethyl Corp.), an 80/20 isomeric mixture of di(methylthio)-2,4-toluene diamine and di(methylthio)-2,6-toluene diamine
(5) F is the average number of reactive sites per molecule.

TABLE 5
Sample Polyurea RIM Formulations using Diamines and a Second Chain Extender Polyamine (1).

| | | | |
|---|---|---|---|
| Isocyanate | MDI prepolym. 0.438 kg 2.40 equiv. | MDI prepolym. 0.438 kg 2.40 equiv. | MDI Prepolym 0.438 kg 2.40 equiv. |
| Polyamine Backbone | Polyoxyalkylene amine Mol. Wt. 5000 F = 3[6] 2.000 kg | Polyoxyalkylene amine Mol. Wt. 5000 F = 3 2.000 kg | Polyoxyalkylene amine Mol. Wt. 5000 F = 3 2.000 kg |

TABLE 5-continued

Sample Polyurea RIM Formulations using Diamines and a Second Chain Extender Polyamine (1).

| Diamine | 1.20 equiv. (2) | 1.20 equiv. (3) | 1.20 equiv. (4) |
|---|---|---|---|
|  | 0.006 kg. | 0.009 kg. | 0.007 kg |
|  | 0.06 equiv. (5%) | 0.06 equiv. (5%) | 0.06 equiv. (5%) |
| Chain extender | A (5) | A (5) | A (5) |
| Polyamine | 0.096 kg | 0.096 kg | 0.096 kg |
|  | 1.08 equiv. (95%) | 1.08 equiv. (95%) | 1.08 equiv. (95%) |
| Catalyst | NONE | NONE | NONE |
| Stream Temp. | 50° C. | 50° C. | 50° C. |
| Mold Temp | 70° C. | 70° C. | 70° C. |
| Post-cure Temp. | 100° C. | 100° C. | 100° C. |
| Post-cure Time, h | 1.0 | 1.0 | 1.0 |

(1) Ratios of the reagents metered out reflect the masses listed in the table.
(2) Diamine is N,N'-di[3-(5-methylheptyl)]-1,4'-phenylenediamine. Equivalent weight is 166.3.
Isocyanate index is 1.05 in all cases.
(3) Diamine is N,N'-di(2-butyl)-1,2-phenylenediamine. Equivalent weight is 110.2
(4) Diamine is N,N'-diphenyl-1,4-phenylenediamine. Equivalent weight is 130.2.
(5) A = diethyltoluene diamine (DETDA)
(6) F is the average number of reactive sites per molecule.

What is claimed is:

1. A reaction injection molded elastomer made by reacting in a closed mold a first stream comprising one or more polyisocyanates with a second stream comprising from about 0.7 to about 1.3 equivalents of a blend of compounds having isocyanate reactive hydrogens said blend consisting essentially of a backbone polyamine ($B_A$) or a backbone polyol ($B_o$) and a first chain extender polyamine (D) which is at least one N,N'-disubstituted phenylenediamine of the structure,

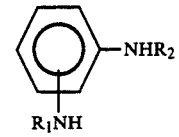

where $R_1$ and $R_2$ are independently selected from the group consisting of monovalent alkyl, alkenyl and aryl moieties where the alkyl and alkenyl moieties contain from 1 to about 20 carbon atoms, along with a second chain extender amine selected from the group consisting of 1-methyl-3,5-diethyl-2,4-diaminobenzene, 1-methyl-3,5-diethyl-2,6-diaminobenzene, toluene diamine, 1,3,5-triethyl-2,6-diaminobenzene, 3,3'-diaminodiphenylmethane where the second chain extender polyamine constitues from about 80 to about 99% equivalents percent of the mixture of chain extender polyamines and the mixture of first and second chain extender polyamines constitutes from about 20 to about 80 equivalents percent of the blend.

2. The elastomer of claim 1 where the second stream contains from 0.85 to 1.05 equivalents of isocyanate-reactive components.

3. The elastomer of claim 2 where the second stream contains from about 0.90 to about 1.0 equivalents.

4. The elastomer of claim 1 where the polyisocyanate is toluene diisocyanate, methylenediphenyl diisocyanate, or a polymer of methylenediphenyl diisocyanate.

5. The elastomer of claim 1 where at least one R is an aryl moiety containing from 6 to 10 carbon atoms.

6. The elastomer of claim 5 where the aryl moiety is phenyl.

7. The elastomer of claim 1 where the alkyl or alkenyl moiety contains from 1 to about 10 carbon atoms.

8. The elastomer of claim 7 where the moiety contains from 1 to 6 carbon atoms.

9. The elastomer of claim 1 where the moiety is an alkyl moiety.

10. The elastomer of claim 9 where the alkyl moiety is a secondary alkyl moiety.

11. The elastomer of claim 10 where the alkyl moiety is isopropyl or sec-butyl.

12. The elastomer of claim 1 where the diamine is a paraphenylenediamine.

13. The elastomer of claim 5 where the diamine is N,N'-di-sec-butyl-para-phenylene diamine.

* * * * *